US012745193B2

(12) United States Patent
Yang

(10) Patent No.: US 12,745,193 B2
(45) Date of Patent: Sep. 22, 2026

(54) P-MPR REPORTING METHOD AND TERMINAL

(71) Applicant: VIVO MOBILE COMMUNICATION CO., LTD., Dongguan (CN)

(72) Inventor: Yu Yang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 288 days.

(21) Appl. No.: 18/431,109

(22) Filed: Feb. 2, 2024

(65) Prior Publication Data

US 2024/0172140 A1 May 23, 2024

Related U.S. Application Data

(63) Continuation of application No. PCT/CN2022/110334, filed on Aug. 4, 2022.

(30) Foreign Application Priority Data

Aug. 5, 2021 (CN) ......................... 202110898641.3

(51) Int. Cl.
*H04W 52/36* (2009.01)

(52) U.S. Cl.
CPC ....... *H04W 52/367* (2013.01); *H04W 52/365* (2013.01)

(58) Field of Classification Search
CPC . H04W 52/367; H04W 52/365; H04W 52/42; H04W 52/36; H04B 7/06956; H04L 5/0053; Y02D 30/70
See application file for complete search history.

(56) References Cited

U.S. PATENT DOCUMENTS 9,020,556 B2 * 4/2015 Haim .................... H04W 52/34 455/67.11
9,049,619 B2 * 6/2015 Park .................. H04W 52/0203
11,419,066 B2 * 8/2022 Jeon ...................... H04W 76/11
2007/0121746 A1 * 5/2007 Cho ...................... H04L 5/0044 375/260
2012/0176923 A1 * 7/2012 Hsu ..................... H04W 52/367 370/252

(Continued)

FOREIGN PATENT DOCUMENTS

CN 102414992 A 4/2012
CN 108810964 A 11/2018

(Continued)

OTHER PUBLICATIONS

CATT, "Enhancements on multi-beam operation", 3GPP TSG RAN WG1 #105-e, e-Meeting, May 19-27, 2021, R1-2104484.

(Continued)

*Primary Examiner* — Dominic E Rego
(74) *Attorney, Agent, or Firm* — The Webb Law Firm

(57) ABSTRACT

A P-MPR reporting method includes determining, by a terminal, at least one target P-MPR value; and sending, by the terminal, a P-MPR report to a network device. The P-MPR report carries the at least one target P-MPR value, and a target P-MPR value corresponds to at least one target identification information, and target identification information includes at least one of beam identification information, antenna panel identification information, or group identification information of a beam group.

20 Claims, 8 Drawing Sheets

(56) References Cited

U.S. PATENT DOCUMENTS

| | | | | |
|---|---|---|---|---|
| 2012/0207112 | A1* | 8/2012 | Kim | H04W 52/545 370/328 |
| 2014/0092838 | A1* | 4/2014 | Coan | H04W 52/327 370/329 |
| 2015/0195795 | A1* | 7/2015 | Loehr | H04W 52/365 455/522 |
| 2017/0181107 | A1* | 6/2017 | Roji | H04B 1/04 |
| 2018/0124709 | A1* | 5/2018 | Seo | H04W 52/325 |
| 2019/0053170 | A1 | 2/2019 | Lee et al. | |
| 2020/0145079 | A1* | 5/2020 | Marinier | H04B 7/0408 |
| 2020/0145987 | A1 | 5/2020 | Ji et al. | |
| 2020/0314764 | A1* | 10/2020 | Noh | H04B 7/0617 |
| 2021/0144652 | A1* | 5/2021 | Gheorghiu | H04W 52/365 |
| 2021/0234598 | A1* | 7/2021 | Raghavan | H04B 7/0639 |
| 2021/0297959 | A1* | 9/2021 | Zhou | H04B 1/3838 |
| 2022/0052807 | A1* | 2/2022 | Liu | H04L 5/0051 |
| 2022/0053606 | A1* | 2/2022 | Jeong | H04L 63/0853 |
| 2022/0116891 | A1* | 4/2022 | Yao | H04W 52/42 |
| 2022/0377680 | A1* | 11/2022 | Yuan | H04W 52/367 |
| 2022/0400446 | A1* | 12/2022 | Ng | H04W 52/241 |
| 2023/0031429 | A1* | 2/2023 | Khoshnevisan | H04W 52/365 |
| 2023/0041095 | A1* | 2/2023 | Zhou | H04B 7/0619 |
| 2024/0063859 | A1* | 2/2024 | Grieco | H04B 7/0486 |
| 2024/0283585 | A1* | 8/2024 | Zhang | H04B 7/0691 |
| 2026/0005718 | A1* | 1/2026 | Zhou | H04B 1/3838 |

FOREIGN PATENT DOCUMENTS

| | | | |
|---|---|---|---|
| CN | 109155659 | A | 1/2019 |
| CN | 109314934 | A | 2/2019 |
| CN | 111436105 | A | 7/2020 |
| CN | 113163438 | A | 7/2021 |
| CN | 113973363 | A | 1/2022 |
| WO | 2020143048 | A1 | 7/2020 |
| WO | 2020143761 | A1 | 7/2020 |
| WO | 2020147626 | A1 | 7/2020 |
| WO | 2021147913 | A1 | 7/2021 |
| WO | 2021149259 | A1 | 7/2021 |
| WO | 2023153888 | A1 | 8/2023 |

OTHER PUBLICATIONS

VIVO, "Further discussion on multi beam enhancement", 3GPP TSG RAN WG1 #104b-e, e-Meeting, Apr. 12-20, 2021, R1-2102506.

Xiaomi, " Enhancements on multi-beam operation", 3GPP TSG RAN WG1 #105-e, e-Meeting, May 10-27, 2021, R1-2105540.

Sony, "Considerations on the enhancement of multi-beam operation", 3GPP TSG RAN WG1 #102e, R1-2005560, E-meeting, Aug. 17-28, 2020, 10 pages.

Vivo, "Further discussion on multi beam enhancement", 3GPP TSG RAN WG1 #105-e, e-Meeting, May 10-27, 2021, R1-2104343.

* cited by examiner

Figure 2:
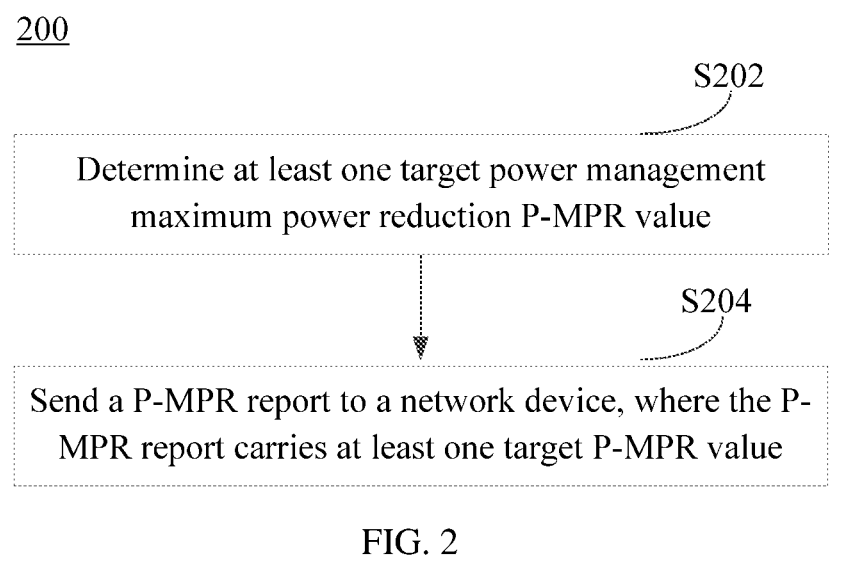

200

S202

Determine at least one target power management maximum power reduction P-MPR value

S204

Send a P-MPR report to a network device, where the P-MPR report carries at least one target P-MPR value

Figure 3:
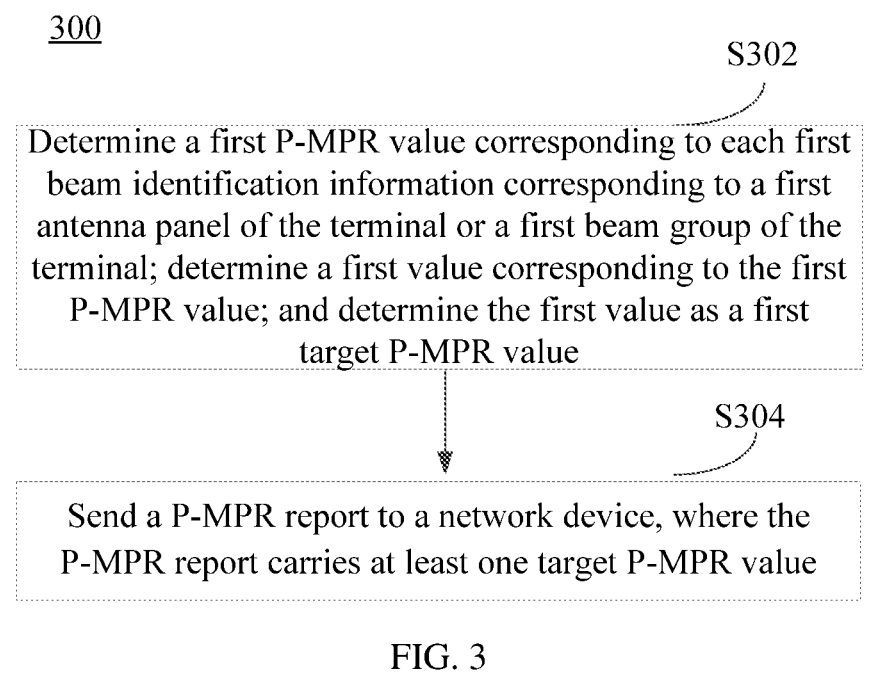

Determine a first P-MPR value corresponding to each first beam identification information corresponding to a first antenna panel of the terminal or a first beam group of the terminal; determine a first value corresponding to the first P-MPR value; and determine the first value as a first target P-MPR value

S304

Send a P-MPR report to a network device, where the P-MPR report carries at least one target P-MPR value

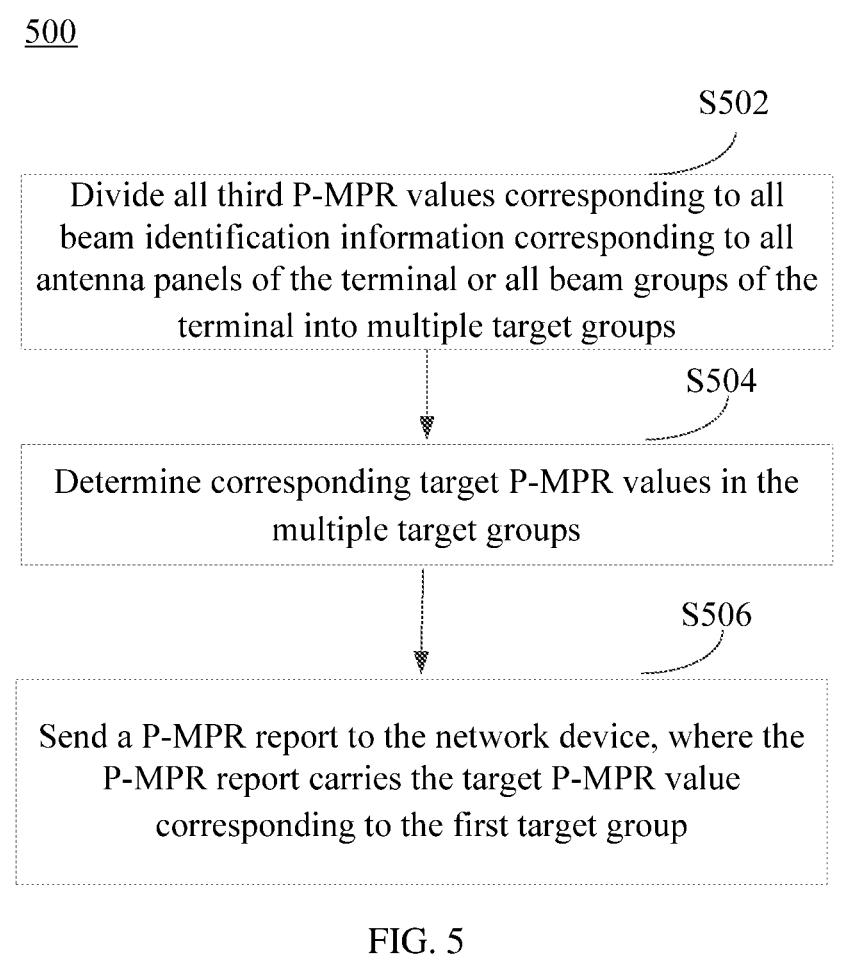

Divide all third P-MPR values corresponding to all beam identification information corresponding to all antenna panels of the terminal or all beam groups of the terminal into multiple target groups

S504

Determine corresponding target P-MPR values in the multiple target groups

S506

Send a P-MPR report to the network device, where the P-MPR report carries the target P-MPR value corresponding to the first target group

FIG. 5

P-MPR REPORTING METHOD AND TERMINAL

CROSS-REFERENCE TO RELATED APPLICATIONS

This application is a Bypass Continuation Application of International Patent Application No. PCT/CN2022/110334, filed Aug. 4, 2022, and claims priority to Chinese Patent Application No. 202110898641.3, filed Aug. 5, 2021, the disclosures of which are hereby incorporated by reference in their entireties.

BACKGROUND OF THE INVENTION

Field of the Invention

The embodiments of the present application relate to the field of communications, and in particular, to a P-MPR reporting method and a terminal.

Description of Related Art

At present, when user equipment (UE) communicates with a network device, it is often necessary to perform power backoff on uplink transmit power according to the maximum permissible exposure (MPE) requirement, including the maximum radiation value or the maximum irradiation level that causes harm after human body is exposed to radiation. The UE can determine the maximum output power based on the P-MPR and report it to the network device to ensure that it meets the available battery energy absorption requirement.

SUMMARY OF THE INVENTION

According to a first aspect, a P-MPR reporting method is provided. The method includes: determining, by a terminal, at least one target power management maximum power reduction P-MPR value; and sending a P-MPR report to a network device, where the P-MPR report carries the at least one target P-MPR value, and a target P-MPR value corresponds to at least one target identification information, and target identification information includes: at least one of beam identification information, antenna panel identification information, or group identification information of a beam group.

According to a second aspect, a P-MPR reporting apparatus is provided. The apparatus includes: a determination module, configured to determine at least one target power management maximum power reduction P-MPR value; and a sending module, configured to send a P-MPR report to a network device, where the P-MPR report carries the at least one target P-MPR value, and a target P-MPR value corresponds to at least one target identification information, and target identification information includes: at least one of beam identification information, antenna panel identification information, or group identification information of a beam group.

According to a third aspect, a terminal is provided, where the terminal includes a processor, a memory, and a program or an instruction stored in the memory and executable on the processor, where when the program or instruction is executed by the processor, steps of the method according to the first aspect are implemented.

According to a fourth aspect, a terminal is provided, including a processor and a communication interface, where the processor is configured to determine at least one target power management maximum power reduction P-MPR value; and send a P-MPR report to a network device, where the P-MPR report carries the at least one target P-MPR value, and a target P-MPR value corresponds to at least one target identification information, and target identification information includes: at least one of beam identification information, antenna panel identification information, or group identification information of a beam group.

According to a fifth aspect, a non-transitory readable storage medium is provided. The non-transitory readable storage medium stores a program or an instruction, and when the program or the instruction is executed by a processor, steps of the method in the first aspect are implemented.

According to a sixth aspect, a computer program product is provided. The computer program product includes a processor, a memory, and a program or an instruction stored in the memory and executable on the processor, where when the program or the instruction is executed by the processor, the steps of the method according to the first aspect are implemented.

According to a seventh aspect, a chip is provided, the chip includes a processor and a communication interface, the communication interface is coupled to the processor, and the processor is used to run programs or instructions, so as to implement the method according to the first aspect.

According to an eighth aspect, a computer program/program product is provided, the computer program/program product is stored in a non-volatile storage medium, and the program/program product is executed by at least one processor to implement the method described in the first aspect.

According to a ninth aspect, an electronic device is provided, the electronic device being configured to perform the method according to the first aspect.

BRIEF DESCRIPTION OF THE DRAWINGS

FIG. 2 is a schematic flowchart of a P-MPR reporting method according to an embodiment of the present application;

FIG. 3 is a schematic flow chart of a P-MPR reporting method according to another embodiment of the present application;

FIG. 5 is a schematic flow chart of a P-MPR reporting method according to another embodiment of the present application;

DESCRIPTION OF THE INVENTION

The following clearly describes technical solutions in embodiments of this application with reference to accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

The terms "first", "second", and the like in this specification and claims of this application are used to distinguish between similar objects instead of describing a specific order or sequence. It should be understood that the data used in such a way is interchangeable in proper circumstances, so that the embodiments of the present application described herein can be implemented in an order other than the order illustrated or described herein. In addition, in this specification and the claims, "and/or" represents at least one of connected objects, and a character "/" generally represents an "or" relationship between associated objects.

It should be noted that, the technologies described in the embodiments of this application are not limited to a Long Term Evolution (LTE)/LTE-Advanced (LTE-A) system, and can also be used in other wireless communications systems such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and another system.

The terms "system" and "network" in the embodiments of this application may be used interchangeably. The technologies described can be applied to both the systems and the radio technologies mentioned above as well as to other systems and radio technologies. A new radio (NR) system is described in the following description for illustrative purposes, and the NR terminology is used in most of the following description, although these technologies can also be applied to applications other than the NR system application, such as the 6-th generation (6G) communication system.

Figure 1:
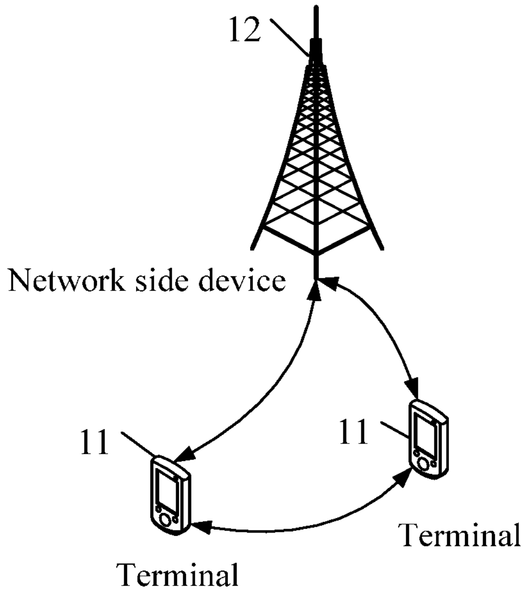
FIG. 1 is a schematic diagram of a wireless communications system to which an embodiment of this application can be applied.

FIG. 1 is a schematic diagram of a wireless communications system to which an embodiment of this application can be applied. The wireless communications system includes a terminal 11 and a network side device 12. The terminal 11 may also be called a terminal device or user equipment (UE), and the terminal 11 may be smart watches, a mobile phone, a tablet personal computer, a laptop computer or a notebook computer, a personal digital Assistant (PDA), a palmtop computer, a netbook, an ultra-mobile personal computer (UMPC), a mobile Internet device (MID), a wearable device or a vehicle-mounted device (VUE), a pedestrian terminal (PUE), and other terminal side devices. The wearable device includes: bracelets, earphones, glasses, etc.

It should be noted that a type of the terminal 11 is not limited in the embodiments of this application. The network side device 12 may be a base station or a core network. The base station may be referred to as a node B, an evolved node B, an access point, a base transceiver station (BTS), a radio base station, a radio transceiver, a basic service set (BSS), an extended service set (ESS), a node B, an evolved node B (eNB), a home node B, a home evolved node B, a wireless local area network (WLAN) access point, a WiFi node, a transmission reception point (TRP), or other appropriate terms in the art. As long as a same technical effect is achieved, the base station is not limited to a specified technical term. It should be noted that, in embodiments of the present application, only a base station in the NR system is used as an example, but a type of the base station is not limited.

The P-MPR reporting method provided by the embodiment of the present application will be described in detail below through some embodiments and application scenarios with reference to the accompanying drawings.

Usually, in high frequency bands, the UE needs to use beams for uplink transmission. When the UE has multiple antenna panels, each panel generates at least one beam. Since spatial propagation paths of beams are different, when the same power backoff is applied to all beams of the UE, the transmission performance of each beam link cannot be fully reflected when an MPE event occurs, affecting the uplink performance.

As shown in FIG. 2, the embodiment of the present application provides a P-MPR reporting method 200, which can be executed by a terminal, in other words, the method can be executed by software or hardware installed in the terminal, and the method includes the following steps.

S202: Determine at least one target power management maximum power reduction P-MPR value.

S204: Send a P-MPR report to a network device, where the P-MPR report carries at least one target P-MPR value.

The target P-MPR value corresponds to at least one target identification information, and the target identification information includes: at least one of beam identification information, antenna panel identification information, or group identification information of a beam group.

In an implementation, when the maximum number N of target P-MPR values carried in the P-MPR report is greater than 1, one target P-MPR value may correspond to one or more beam identification information. In an implementation, the multiple pieces of beam identification information are any one of the following:

multiple pieces of beam identification information corresponding to a beam group, for example, all beam identification information corresponding to a beam group; and multiple pieces of beam identification information corresponding to an antenna panel, for example, all beam identification information corresponding to an antenna panel.

In an implementation, the beam identification information may be determined by the terminal. In other words, the UE may determine, in the previous step, beam identification information whose corresponding P-MPR values need to be reported. In an implementation, the target P-MPR value is determined from P-MPR values corresponding to the multiple pieces of beam identification information.

In this embodiment, the beam information can also be called: at least one of beam information, spatial relation information, spatial domain transmission filter information, spatial domain reception filter information, spatial filter information, transmission configuration indicator (TCI) state information, Quasi co-location (QCL) information or QCL parameters, etc. The downlink beam information can usually be represented by TCI state information or QCL information. The uplink beam information may usually be represented by TCI state information or spatial relation information.

The beam identification information can also be called: TCI state identity (ID), RS resource ID, RS resource set ID, or the like. The RS resource ID can be sounding reference signal (SRS) resource ID, resource ID of the source RS in the spatial relationship information of the SRS resource, synchronization signal and physical broadcast channel block (SSB) resource ID, channel state information-reference signal (CSI-RS) resource ID, resource ID of the source RS in the TCI state of the CSI-RS resource, or the like.

The antenna panel may also be called: at least one of antenna group, antenna port group, antenna set, antenna port set, beam set, beam sub-set, antenna array, antenna port array, antenna sub-array, antenna port sub-array, logic entity, entity, antenna entity, or the like.

The identifier of the panel may include: at least one of the identifier of the antenna panel, the reference signal resource identifier, the reference signal resource set identifier, the TCI state identifier, the QCL information identifier, the spatial relationship identifier, or the like.

Embodiments of the present application provide a P-MPR reporting method. The terminal determines at least one target power management maximum power reduction P-MPR value; and sending a P-MPR report to a network device, where the P-MPR report carries at least one target P-MPR value, and the target P-MPR value corresponds to at least one target identification information, and the target identification information includes: at least one of beam identification information, antenna panel identification information, or group identification information of a beam group. This can avoid that when an MPE event occurs, the same power backoff is applied to all beams, so that the transmission performance of each beam link can be fully reflected, ensuring the uplink performance.

As shown in FIG. 3, the embodiment of the present application provides a P-MPR reporting method 300, which can be executed by a terminal, in other words, the method can be executed by software or hardware installed in the terminal, and the method includes the following steps.

S302: Determine a first P-MPR value corresponding to each first beam identification information corresponding to a first antenna panel of the terminal or a first beam group of the terminal; determine a first value corresponding to the first P-MPR value; and determine the first value as a first target P-MPR value.

The first value is one of the minimum value, the maximum value, and the statistical average value of each of first P-MPR values.

For example, it is determined that the first P-MPR values corresponding to beam1, beam2, and beam3 on the first antenna panel of the terminal are 1 db, 5 db, and 10 db respectively, and the maximum value 10 db among them can be determined as the first value.

The first target P-MPR value corresponds to at least one of the identification information of the first antenna panel, the group identification information of the first beam group, first beam identification information corresponding to the first antenna panel, or first beam identification information corresponding to the first beam group. For example, the first value 10 db is determined as the first target P-MPR value, where the first target P-MPR value 10 db may correspond to the identification information of the first antenna panel.

S304: Send a P-MPR report to a network device, where the P-MPR report carries at least one target P-MPR value.

For example, a P-MPR report is sent to the network device, and the P-MPR report carries the target P-MPR value 10 db. In other words, the largest first P-MPR value among beam1, beam2, and beam3 on the first antenna panel can be reported as the P-MPR value corresponding to the first antenna panel, and other first P-MPR values are not reported.

In an implementation, this step can be performed when the maximum number N of target P-MPR values that can be carried in the P-MPR report is less than the maximum number M of target P-MPR values supported by the terminal. That is, the first target P-MPR values corresponding to each of the N first antenna panels of the terminal or the first beam group are reported.

In another implementation, in a case that the first value meets a first reporting condition, the P-MPR report may carry the first target P-MPR value. In an implementation, the first reporting condition may be determined by the terminal, that is, the terminal may determine whether to report the first target P-MPR value corresponding to the first antenna panel or the first beam group. Optionally, the first reporting condition can also be configured by the network device.

For example, the terminal may determine or the network device may configure that reporting is performed when the first value is greater than 5 db; otherwise, reporting is not performed. For example, the first value 10 db determined in the previous step is greater than 5 db; therefore, this step can be performed for reporting. On the contrary, if the smallest first P-MPR value 1 db among beam 1, beam2, and beam3 is used as the first value in the previous step, the first reporting condition determined by the terminal in this step is not met, and no reporting is performed. Therefore, in a case that the first target P-MPR value corresponding to the first antenna panel or the first beam group does not meet the first reporting condition, the target P-MPR value of the first antenna panel or the first beam group is not reported.

In the process of determining the target P-MPR value, in this step, a first value is determined based on multiple P-MPR values corresponding to multiple beams in an antenna panel (such as the first antenna panel) or a beam group (the first beam group), and it is determined whether to report based on the first value.

This step may also use the same or similar description as step S204 in the embodiment of FIG. 2, which will not be described again.

Therefore, in the P-MPR reporting method provided by the embodiment of the present application, the first P-MPR value corresponding to each first beam identification information corresponding to the first antenna panel of the terminal or the first beam group of the terminal is determined; the first A first value corresponding to the first P-MPR value is determined; and the first value is determined as the first target P-MPR value. In this way, one target P-MPR value is reported for each antenna panel or each beam group, avoiding that the same power backoff is applied to all beams. The transmission performance of each beam link is fully reflected, thereby ensuring uplink performance. In addition, only one first target P-MPR value can be reported for one antenna panel or beam group, which can save signaling overhead.

Therefore, in the P-MPR reporting method provided by the embodiment of the present application, the first target P-MPR value is carried in the P-MPR report in a case that the first value meets the first reporting condition. This avoids redundant reporting and saves signaling overhead.

Figure 4:
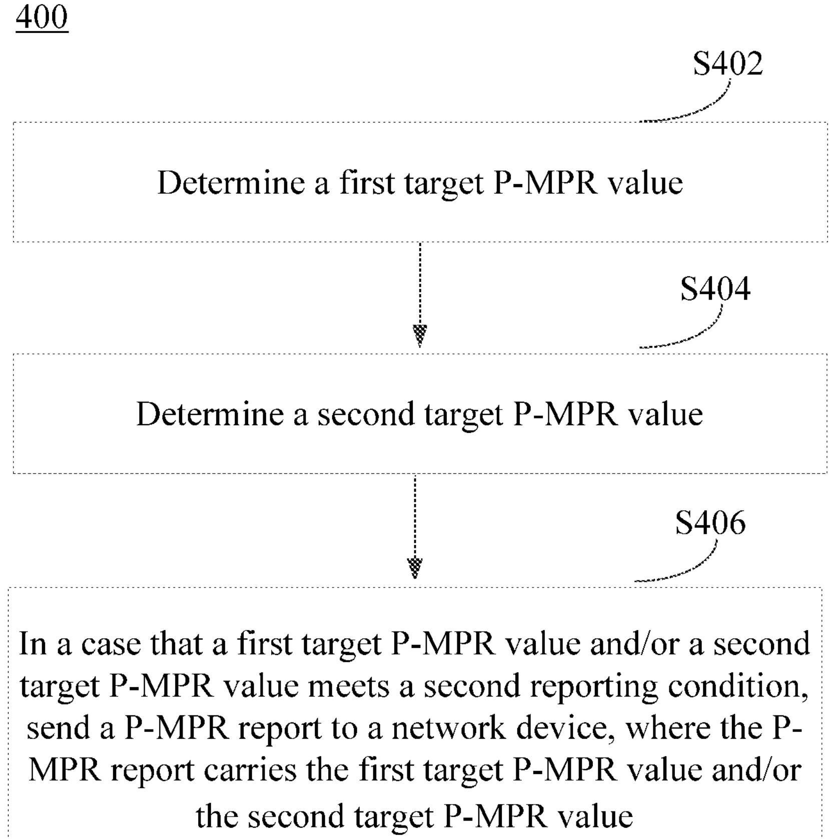
FIG. 4 is a schematic flow chart of a P-MPR reporting method according to another embodiment of the present application.

As shown in FIG. 4, the embodiment of the present application provides a P-MPR reporting method 400, which can be executed by a terminal, in other words, the method can be executed by software or hardware installed in the terminal, and the method includes the following steps.

S402: Determine a first target P-MPR value.

The first P-MPR value corresponding to each first beam identification information corresponding to the first antenna panel of the terminal or the first beam group of the terminal is determined; the first value corresponding to the first P-MPR value is determined, where the first value is one of the minimum value, the maximum value and the statistical average value of each of first P-MPR values; and the first value is determined as the first target P-MPR value.

The first target P-MPR value corresponds to at least one of the identification information of the first antenna panel, the group identification information of the first beam group, first beam identification information corresponding to the first antenna panel, or first beam identification information corresponding to the first beam group.

For this step, refer to the description of step S302 in the embodiment of FIG. 3, and the repeated parts will not be repeated herein.

S404: Determine a second target P-MPR value.

The second P-MPR value corresponding to each second beam identification information corresponding to the second antenna panel of the terminal or the second beam group of the terminal is determined; the second value corresponding to the second P-MPR value is determined, where the second value is one of the minimum value, the maximum value and the statistical average value of each of second P-MPR values; and the second value is determined as the second target P-MPR value.

The second target P-MPR value corresponds to at least one of the identification information of the second antenna panel, the group identification information of the second beam group, second beam identification information corresponding to the second antenna panel, or second beam identification information corresponding to the second beam group. For this step, refer to the description of step S302 in the embodiment of FIG. 3, and the repeated parts will not be repeated herein.

S406: In a case that a first target P-MPR value and/or a second target P-MPR value meets a second reporting condition, send a P-MPR report to a network device, where the P-MPR report carries the first target P-MPR value and/or the second target P-MPR value.

This step may also use the same or similar description as step S204 in the embodiment of FIG. 2, which will not be described again.

In an implementation, the second reporting condition may be determined by the UE or configured by the network device, and may optionally include numerical conditions, such as a reporting threshold. Reporting may be performed when the first target P-MPR value and/or the second target P-MPR value is greater than the threshold; otherwise, reporting is not performed.

In another implementation, the second reporting condition may include a number condition, for example, when the maximum number N of target P-MPR values carried in the P-MPR report is less than the number L of antenna panels of the terminal, or when N is less than the number O of beam groups of the terminal. Because the limitation of N prevents the P-MPR values corresponding to some antenna panels or beam groups from being reported, it is necessary to determine j target P-MPR values for reporting from L P-MPR values corresponding to L antenna panels or from O P-MPR values corresponding to O beam groups, where j is less than or equal to N. Therefore, the number j of reported target P-MPR values can be determined based on the second reporting condition. For example, when N is 3 and is less than the number of antenna panels of the terminal, that is, 5, it is necessary to determine at most 3 target P-MPR values for reporting from the 5 P-MPR values corresponding to the 5 antenna panels.

In another implementation, the second reporting condition may include a number condition and a numerical condition. For example, if the P-MPR values corresponding to some antenna panels or beam groups cannot be reported, the numerical condition can be used to determine j target P-MPR values that meet the numerical condition for reporting from L P-MPR values corresponding to L antenna panels or O P-MPR values corresponding to O beam groups, where j is less than or equal to N. For example, when N is 3 and is less than the number of antenna panels of the terminal, that is, 5, it is necessary to determine at most 3 target P-MPR values for reporting from the 5 P-MPR values corresponding to the 5 antenna panels. The reporting threshold configured by the network is greater than or equal to 4 db. The five P-MPR values corresponding to the five antenna panels are 1 db, 2 db, 3 db, 4 db, and 5 db respectively. Only 4 db and 5 db meet the reporting threshold condition. Therefore, 4 db and 5 db are reported as the target P-MPR values. 2 target P-MPR values are reported, which is less than N. Therefore, this can not only meet the limitation of the maximum number N of target P-MPR values that can be carried in the P-MPR report, but also meet the reporting numerical quality requirement, effectively saving signaling overhead.

In the process of determining the target P-MPR value, this step adopts comparison between at least two antenna panels (for example, the first antenna panel and the second antenna panel), or at least two beam groups (the first beam group and the second beam group), to determine the target P-MPR value for reporting from the P-MPR values corresponding to different antenna panels or different beam groups.

In an implementation, the step in this implementation can be executed when the maximum number N of target P-MPR values that can be carried in the P-MPR report is less than the maximum number M of target P-MPR values supported by the terminal. This is because the target P-MPR values of some antenna panels or beam groups cannot be reported. By performing comparison between at least two antenna panels or at least two beam groups, target P-MPR values for reporting can be determined. On the contrary, this step in the embodiment of FIG. 3 can be performed when the maximum number N of target P-MPR values that can be carried in the P-MPR report is greater than the maximum number M of target P-MPR values supported by the terminal. That is, for each first antenna panel or first beam group of the terminal, its corresponding first target P-MPR value is reported; therefore, the step of determining the target P-MPR value corresponding to the first antenna panel or first beam group is performed.

Therefore, in the P-MPR reporting method provided by the embodiment of the present application, the second target P-MPR value is determined, and in a case that the first target P-MPR value and/or the second target P-MPR value meets the second reporting condition, the P-MPR report carries the first target P-MPR value and/or the second target P-MPR value, avoiding that the same power backoff is applied to all beams. The transmission performance of each beam link is fully reflected, thereby ensuring uplink performance. In addition, reporting can be performed in a case that the reporting condition is met, which can save signaling overhead.

As shown in FIG. 5, the embodiment of the present application provides a P-MPR reporting method 500, which can be executed by a terminal, in other words, the method can be executed by software or hardware installed in the terminal, and the method includes the following steps.

S502: Divide all third P-MPR values corresponding to all beam identification information corresponding to all antenna panels of the terminal or all beam groups of the terminal into multiple target groups.

In an implementation, the number of target groups meets at least one of the following:

configured by the network;

specified in the protocol;

determined by the terminal;

less than or equal to the number of antenna panels;

less than or equal to the number of beam groups supported by the terminal;

less than or equal to the number of beams supported by the terminal;

less than or equal to the number of beams on the antenna panel of the terminal; or less than or equal to the number of beams in the beam group supported by the terminal.

For example, the third P-MPR values 1 db, 2 db, and 3 db corresponding to the beam identification information beam1, beam2, and beam3 corresponding to the first antenna panel of the terminal are divided into the first target group. The third P-MPR values 4 db and 5 db corresponding to the beam identification information beam4 and beam5 corresponding to the second antenna panel of the terminal are divided into the second target group.

S504: Determine corresponding target P-MPR values in the multiple target groups.

In an implementation, a third value corresponding to each third P-MPR value in the first target group can be determined, where the third value is one of the minimum value, the maximum value and the statistical average value of each of third P-MPR values in the first target group. Each third P-MPR value in the first target group is updated based on the third value, and the target P-MPR value corresponding to the first target group is determined based on each updated third P-MPR value.

Taking the first target group as an example, the first target group includes third P-MPR values 1 db, 2 db, and 3 db corresponding to beam 1, beam2, and beam3, and the corresponding third value is the maximum value 3 db. Each third P-MPR value corresponding to beam 1, beam2, and beam3 in the first target group is updated based on the third value 3 db, and each third P-MPR value corresponding to beam1, beam2, and beam3 is assigned as 3 db, and the target P-MPR value corresponding to the first target group is determined according to each updated third P-MPR value, that is, the target P-MPR value corresponding to the first target group is {3 db, 3 db, 3 db}. Beam1, beam2, and beam3 can be beams on an antenna panel or in a beam group.

In another implementation, the target P-MPR value corresponding to the first target group may be determined according to each third P-MPR value in the first target group. For example, this step may be performed when the difference between the third P-MPR values in the first target group is less than a preset difference. For example, the preset difference is 3 db. The differences between third P-MPR values 1 db, 2 db, and 3 db corresponding to beam 1, beam2, and beam3 in the first target group are all less than 3 db. Therefore, it is determined that the target P-MPR value corresponding to the first target group is { 1 db, 2 db, 3 db} based on the third P-MPR values 1 db, 2 db, and 3 db corresponding to beam 1, beam2, and beam3 in the first target group.

In an implementation, the corresponding target P-MPR values in the multiple target groups meet at least one of the following that:

the corresponding target P-MPR value in each target group corresponds to one piece of antenna panel identification information;

the corresponding target P-MPR value in each target group corresponds to beam identification information corresponding to one antenna panel;

the corresponding target P-MPR value in each target group corresponds to beam identification information corresponding to one beam group;

the corresponding target P-MPR value in each target group corresponds to group identification information of one beam group;

each of corresponding target P-MPR values in each target group corresponds to beam identification information corresponding to one antenna panel;

each of corresponding target P-MPR values in each target group corresponds to beam identification information corresponding to one beam group; or each of corresponding target P-MPR values in each target group corresponds to one piece of beam identification information.

S506: Send a P-MPR report to the network device, where the P-MPR report carries the target P-MPR value corresponding to the first target group.

In an implementation, this step may be performed in a case that the target P-MPR value corresponding to the first target group meets the third reporting condition. Otherwise, reporting is not triggered. The third reporting condition may be, for example, a threshold condition. In a case that the target P-MPR value corresponding to the first target group is greater than the threshold value included in the third reporting condition, a P-MPR report is sent to the network device. The P-MPR report carries the target P-MPR value corresponding to the first target group. The third reporting condition may be determined by the UE or configured by the network device.

This step may also use the same or similar description as step S204 in the embodiment of FIG. 2, which will not be described again.

Therefore, in the P-MPR reporting method provided by the embodiment of the present application, all third P-MPR values corresponding to all beam identification information corresponding to all antenna panels of the terminal or all beam groups of the terminal are divided into multiple target groups; and the corresponding target P-MPR values in the multiple target groups are determined, to avoid that the same power backoff is applied to all beams, thereby fully reflecting the transmission performance of each beam link and ensuring uplink performance. In addition, a group of target P-MPR values that are the same or have a small difference can be reported to save signaling overhead.

Figure 6:
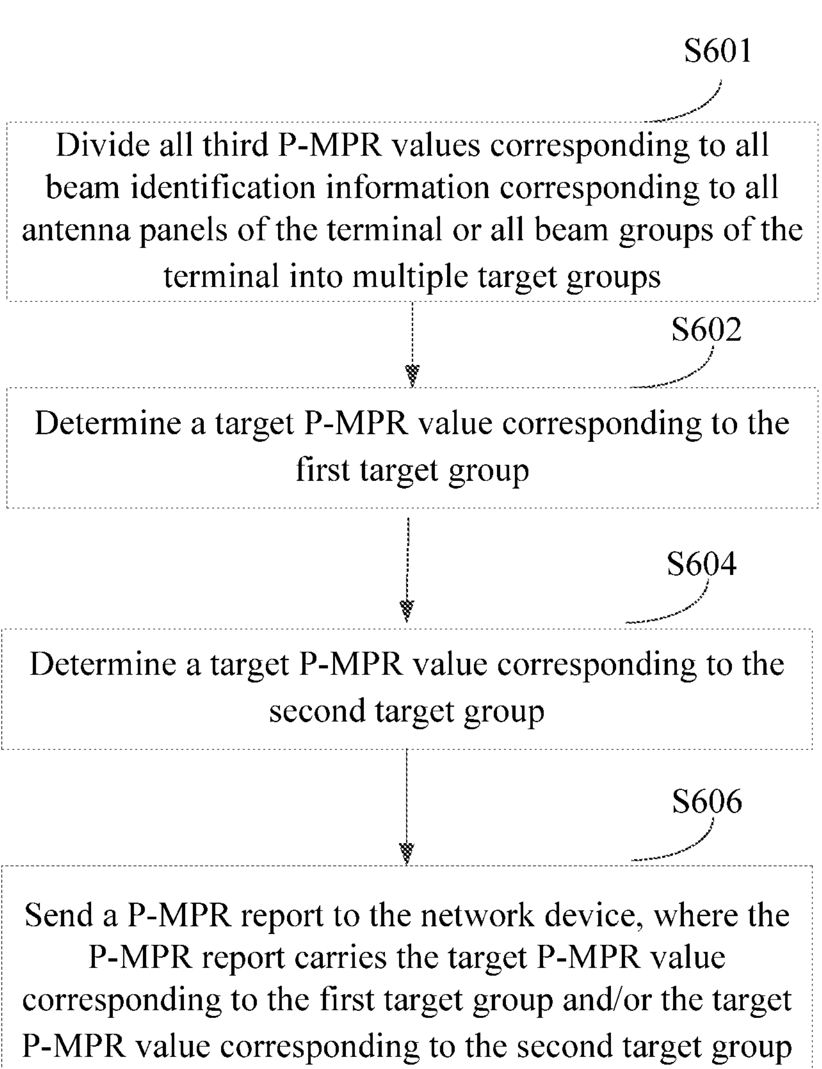
FIG. 6 is a schematic flow chart of a P-MPR reporting method according to another embodiment of the present application.

As shown in FIG. 6, the embodiment of the present application provides a P-MPR reporting method 600, which can be executed by a terminal, in other words, the method can be executed by software or hardware installed in the terminal, and the method includes the following steps.

S601: Divide all third P-MPR values corresponding to all beam identification information corresponding to all antenna panels of the terminal or all beam groups of the terminal into multiple target groups.

S602: Determine a target P-MPR value corresponding to the first target group.

This step can adopt the description of step S502 in the embodiment of FIG. 5 and will not be described again.

S604: Determine a target P-MPR value corresponding to the second target group.

This step can adopt the description of step S502 in the embodiment of FIG. 5 and will not be described again.

S606: Send a P-MPR report to the network device, where the P-MPR report carries the target P-MPR value corresponding to the first target group and/or the target P-MPR value corresponding to the second target group.

In an implementation, in a case that the target P-MPR value corresponding to the first target group and/or the target P-MPR value corresponding to the second target group meets the fourth reporting condition, the P-MPR report carries the target P-MPR value corresponding to the first target group and/or the target P-MPR value corresponding to the second target group.

In an implementation, the fourth reporting condition may be determined by the UE or configured by the network device, and may optionally include numerical conditions, such as a reporting threshold. Reporting may be performed when the first target P-MPR value corresponding to the first target group and/or the second target P-MPR value corresponding to the second target group is greater than the threshold; otherwise, reporting is not performed.

In another implementation, the fourth reporting condition may include a number condition.

For example, when the maximum number N of target P-MPR values carried in the P-MPR report is less than the number N of beams supported by the terminal, it is necessary to determine target P-MPR values corresponding to j target groups from L target groups corresponding to these n beams for reporting, where j is less than L, and the number of beams in j target groups is less than or equal to N. Therefore, the number j of target groups corresponding to the reported target P-MPR values can be determined based on the fourth reporting condition. For example, when N is 3 and is less than the number of beams supported by the terminal, that is, 5, it is necessary to determine and report the target P-MPR values corresponding to at most 2 target groups from, for example, 3 target groups corresponding to 5 beams. The number of beams in the 2 target groups is less than or equal to 3.

For another example, when N is less than the number N of beams on the L antenna panels of the terminal, it is necessary to determine the target P-MPR values corresponding to j target groups from the L target groups corresponding to the L antenna panels for reporting, where j is less than L, and the number of beams in the j target groups is less than or equal to N. Therefore, the number j of target groups corresponding to the reported target P-MPR values can be determined based on the fourth reporting condition. For example, when N is 3 and is less than the number of beams on 3 antenna panels, that is, 5, it is necessary to determine the target P-MPR values corresponding to at most 2 target groups from the 3 target groups corresponding to the 3 antenna panels for reporting, where the number of beams in the 2 target groups is less than or equal to 3.

For another example, when N is less than the number N of beams in O beam groups supported by the terminal, it is necessary to determine the target P-MPR values corresponding to j target groups from the O target groups corresponding to the O beam groups for reporting, where j is less than O, and the number of beams in the j target groups is less than or equal to N. Therefore, the number j of target groups corresponding to the reported target P-MPR values can be determined based on the fourth reporting condition. For example, when N is 3 and is less than the number of beams in 3 beam groups, that is, 5, it is necessary to determine and report the target P-MPR values corresponding to at most 2 target groups from, for example, 3 target groups corresponding to 3 beam groups. The number of beams in the 2 target groups is less than or equal to 3.

In another implementation, the fourth reporting condition may include a number condition and a numerical condition. For example, if the P-MPR values corresponding to some antenna panels or beam groups cannot be reported, the numerical condition can be used to determine the P-MPR values corresponding to j target groups that meet the numerical condition from L target groups corresponding to N beams, L target groups corresponding to L antenna panels, or O target groups corresponding to O beam groups for reporting, where the number of beams in the j target groups is less than or equal to N. For example, when N is 3 and is less than the number of beams on 3 antenna panels, that is, 5, it is necessary to determine the target P-MPR values corresponding to at most 2 target groups from the 3 target groups corresponding to the 3 antenna panels for reporting, where the number of beams in the 2 target groups is less than or equal to 3. The reporting threshold configured by the network is greater than or equal to 4 db. The target P-MPR values corresponding to the three target groups corresponding to the three antenna panels are {3 db, 4 db}, {4 db}, {5 db, 5 db} respectively. Only the target P-MPR values corresponding to the two target groups meet the reporting threshold condition, that is, {4 db} and {5 db, 5 db}. Therefore, {4 db} and {5 db, 5 db} are reported as the target P-MPR values, that is, the target P-MPR values corresponding to the 2 target groups. The number of beams in these 2 target groups is less than or equal to 3.

In the process of determining the target P-MPR value, this step uses comparison between at least two target groups (for example, the first target group and the second target group).

The target P-MPR value is determined from the P-MPR values corresponding to different target groups for reporting.

Therefore, in the P-MPR reporting method provided by the embodiment of the present application, in a case that the first target P-MPR value corresponding to the first target group and/or the second target P-MPR value corresponding to the second target group meets the fourth reporting condition, the P-MPR report carries the first target P-MPR value corresponding to the first target group and/or the second target P-MPR value corresponding to the second target group, avoiding that the same power backoff is applied to all beams. The transmission performance of each beam link is fully reflected, thereby ensuring uplink performance. In addition, reporting can be performed in a case that the reporting condition is met, which can save signaling overhead.

Figure 7:
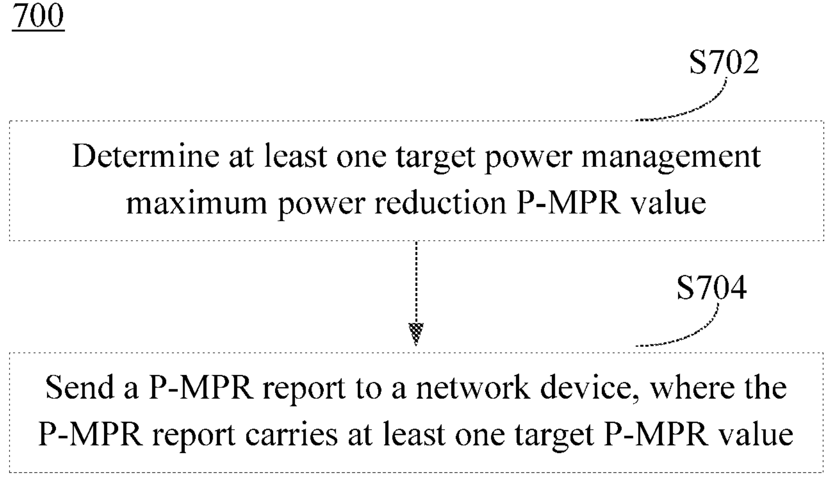
FIG. 7 is a schematic flow chart of a P-MPR reporting method according to another embodiment of the present application.

As shown in FIG. 7, the embodiment of the present application provides a P-MPR reporting method 700, which can be executed by a terminal, in other words, the method can be executed by software or hardware installed in the terminal, and the method includes the following steps.

S702: Determine at least one target power management maximum power reduction P-MPR value.

This step can use the description of the corresponding steps in at least one of the embodiments in FIG. 2 to FIG. 6, which will not be described again here.

S704: Send a P-MPR report to a network device, where the P-MPR report carries at least one target P-MPR value.

This step may also use the same or similar description as step S204 in the embodiment of FIG. 2, which will not be described again.

The target P-MPR value corresponds to at least one target identification information, and the target identification information includes: at least one of beam identification information, antenna panel identification information, or group identification information of a beam group. In other words, the target P-MPR values can be divided into three levels, beam-level P-MPR value, antenna panel-level P-MPR value and beam group-level P-MPR value.

In an implementation, before the terminal sends the P-MPR report to the network device, this embodiment further includes: receiving target configuration information sent by the network device, where the target configuration information is used to indicate that the target P-MPR value corresponds to at least one beam identification information, or at least one antenna panel identification information, or group identification information of at least one beam group. That is, the network configuration indicates one of the above three levels that the target P-MPR value belongs to.

In an implementation, the maximum number N of target P-MPR values carried in the P-MPR report meets at least one of the following:

specified in the protocol;

configured by the network;

determined by the terminal;

less than or equal to the number of antenna panels of the terminal;

less than or equal to the number of beam groups supported by the terminal;

less than or equal to the number of beams supported by the terminal;

less than or equal to the number of beams on the antenna panel of the terminal; or less than or equal to the number of beams in the beam group supported by the terminal.

In an implementation, when the terminal reports a terminal capability, the maximum number M of target P-NPR values supported by the terminal is reported, where the N is less than or equal to the M. For example, the number of antenna panels of the terminal or the number of supported beam groups is reported.

In an implementation, this step may include: in a case that the target condition is met, the terminal sends a P-MPR report to the network device. On the contrary, no reporting is triggered, which can effectively reduce signaling overhead.

The target condition includes at least one of the following that:

a maximum permissible exposure MPE event occurs;

an equivalent isotropically radiated power reaches or exceeds an MPE threshold;

an equivalent isotropically radiated power reaches or exceeds a first threshold;

a maximum equivalent isotropically radiated power reaches or exceeds an MPE threshold;

a maximum equivalent isotropically radiated power reaches or exceeds a second threshold;

a transmit power reaches or exceeds a third threshold;

a transmit power reaches or exceeds an MPE threshold;

a maximum transmit power reaches or exceeds a fourth threshold;

a maximum transmit power reaches or exceeds an MPE threshold;

a radio frequency device is close to the human body;

activating or starting or adding a panel;

a path loss measurement value or a change value of path loss of a current panel or beam reaches or exceeds a fifth threshold;

a power backoff value or a change value of power of a current panel or beam reaches or exceeds a sixth threshold;

a P-MPR value or a change value of P-MPR value of a current panel or beam reaches or exceeds a seventh threshold;

a link quality value or a change value of link quality of a current panel or beam is equal to or lower than an eighth threshold;

a difference between a path loss measurement value of a current panel or beam and a path loss measurement value of a first panel or a first beam reaches or exceeds a ninth threshold;

a difference between a power backoff value of a current panel or beam and a power backoff value of a first panel or a first beam reaches or exceeds a tenth threshold;

a difference between a P-MPR value of a current panel or beam and a P-MPR value of a first panel or a first beam reaches or exceeds an eleventh threshold; or a difference between a link quality value of a current panel or beam and a link quality value of a first panel or a first beam is less than or equal to a twelfth threshold.

In an implementation, in this step, the terminal may send the P-MPR report to the network device through a first command. The first command may be a medium access control control element (MAC CE).

The first command carries at least one of the following information:

the at least one target P-MPR value;

antenna panel identification information corresponding to at least one of the target P-MPR values; where the P-MPR value corresponding to each beam identification information corresponding to at least one of the antenna panels can be divided into one target group according to the description of step S502 in the embodiment of FIG. 5, and in this case, the antenna panel identification information is equivalent to the group identification information of the target group;

the group identification information of the beam group corresponding to at least one of the target P-MPR values; where the P-MPR value corresponding to each beam identification information in at least one of the beam groups can be divided into one target group according to the description of step S502 in the embodiment of FIG. 5, and in this case, the group identification information of the beam group is also equivalent to the group identification information of the target group;

beam identification information corresponding to at least one of the target P-MPR values; for example, a reference signal (RS) resource indicator;

a maximum output power value corresponding to the antenna panel identification information or the group identification information of the beam group or the beam identification information;

a power headroom (PH) value corresponding to the antenna panel identification information or the group identification information of the beam group or the beam identification information;

a maximum output power value of the terminal;

at least one target power value, where the target power value is a maximum output power minus the target P-MPR value;

at least one target power value and antenna panel identification information corresponding to the target power value;

at least one target power value and group identification information of the beam group corresponding to the target power value; or at least one target power value and beam identification information corresponding to the target power value.

The P-MPR reporting method provided by the embodiment of the present application avoids unnecessary reporting by sending the P-MPR report to the network device by the terminal in a case that the target condition is met. This ensures the accuracy of the reported P-MPR, the signaling overhead of the P-MPR report is considered, and the MPE event detection overhead of the UE can also be reduced.

The P-MPR reporting method according to the embodiment of the present application is described in detail above with reference to FIG. 2 to FIG. 7. It can be understood that the interaction between the network device and the terminal described from the network device side is the same as or corresponds to the description from the terminal side in the method shown in FIG. 2 to FIG. 7. To avoid duplication, the details will not be repeated.

It should be noted that, for the P-MPR reporting method provided by the embodiment of the present application, the execution subject may be the P-MPR reporting apparatus, or the control module in the apparatus for executing and loading the above method. In the embodiment of this application, the P-MPR reporting apparatus performing the P-MPR reporting method is used as an example to illustrate the P-MPR reporting method provided by the embodiment of this application.

Figure 8:
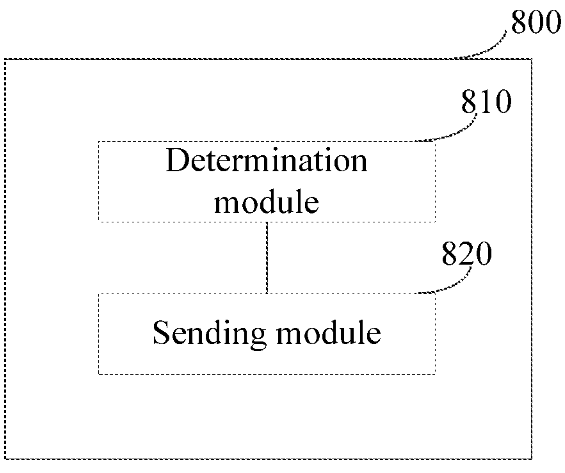
FIG. 8 is a schematic flowchart of a P-MPR reporting apparatus according to an embodiment of the present application.

FIG. 8 is a schematic structural diagram of a P-MPR reporting apparatus according to an embodiment of the present application. As shown in FIG. 8, the P-MPR reporting apparatus 800 includes: a determination module 810 and a sending module 820.

The determination module 810 is configured to determine at least one target power management maximum power reduction P-MPR value. The sending module 820 is configured to send a P-MPR report to a network device, where the P-MPR report carries at least one target P-MPR value, and the target P-MPR value corresponds to at least one target identification information, and the target identification information includes: at least one of beam identification information, antenna panel identification information, or group identification information of a beam group.

In an implementation, the maximum number N of target P-MPR values carried in the P-MPR report meets at least one of the following:

specified in the protocol;

configured by the network;

determined by the terminal;

less than or equal to the number of antenna panels of the terminal;

less than or equal to the number of beam groups supported by the terminal;

less than or equal to the number of beams supported by the terminal;

less than or equal to the number of beams on the antenna panel of the terminal; or less than or equal to the number of beams in the beam group supported by the terminal.

In an implementation, when the terminal reports a terminal capability, the maximum number M of target P-MPR values supported by the terminal is reported, where the N is less than or equal to the M.

In an implementation, in a case that the value of N is greater than 1, one target P-MPR value corresponds to one or multiple pieces of beam identification information.

In an implementation, the multiple pieces of beam identification information are any one of the following:

multiple pieces of beam identification information corresponding to a beam group; and multiple pieces of beam identification information corresponding to an antenna panel.

In an implementation, the beam identification information is determined by the terminal.

In an implementation, the target P-MPR value is determined from P-MPR values corresponding to the multiple pieces of beam identification information.

In an implementation, the determination module 810 is configured to: determine a first P-MPR value corresponding to each first beam identification information corresponding to the first antenna panel of the terminal or the first beam group of the terminal;

determine a first value corresponding to the first P-MPR value; and determine the first value as a first target P-MPR value, where the first target P-MPR value corresponds to at least one of the identification information of the first antenna panel, the group identification information of the first beam group, first beam identification information corresponding to the first antenna panel, or first beam identification information corresponding to the first beam group.

In an implementation, in a case that the first value meets the first reporting condition, the P-MPR report carries the first target P-MPR value.

In an implementation, the determination module 810 is further configured to: after determining the first value as the first target P-MPR value, determine a second target P-MPR value, where the second target P-MPR value corresponds to at least one of the identification information of the second antenna panel, the group identification information of the second beam group, second beam identification information corresponding to the second antenna panel, or second beam identification information corresponding to the second beam group; and in a case that the first target P-MPR value and/or the second target P-MPR value meets a second reporting condition, the P-MPR report carries the first target P-MPR value and/or the second target P-MPR value.

In an implementation, the determination module 810 is further configured to: divide all third P-MPR values corresponding to all beam identification information corresponding to all antenna panels of the terminal or all beam groups of the terminal into multiple target groups; and determine corresponding target P-MPR values in the multiple target groups.

In an implementation, the determination module 810 is configured to: determine a third value corresponding to each of the third P-MPR values in the first target group;

each third P-MPR value in the first target group is updated based on the third value, and the target P-MPR value corresponding to the first target group is determined based on each updated third P-MPR value;

or determine, according to each third P-MPR value in the first target group, the target P-MPR value corresponding to the first target group.

In an implementation, in a case that the target P-MPR value corresponding to the first target group meets a third reporting condition, the P-MPR report carries the target P-MPR value corresponding to the first target group.

In an implementation, the determination module 810 is further configured to: after determining the target P-MPR value corresponding to the first target group, determine a target P-MPR value corresponding to the second target group; and in a case that the target P-MPR value corresponding to the first target group and/or the target P-MPR value corresponding to the second target group meets a fourth reporting condition, the P-MPR report carries the target P-MPR value corresponding to the first target group and/or the target P-MPR value corresponding to the second target group.

In an implementation, the number of target groups meets at least one of the following:

configured by the network;

a protocol stipulation;

determined by the terminal;

less than or equal to the number of antenna panels;

less than or equal to the number of beam groups supported by the terminal;

less than or equal to the number of beams supported by the terminal;

less than or equal to the number of beams on the antenna panel of the terminal; or less than or equal to the number of beams in the beam group supported by the terminal.

In an implementation, the corresponding target P-MPR values in the multiple target groups meet at least one of the following that:

the corresponding target P-MPR value in each target group corresponds to one piece of antenna panel identification information;

the corresponding target P-MPR value in each target group corresponds to beam identification information corresponding to one antenna panel;

the corresponding target P-MPR value in each target group corresponds to beam identification information corresponding to one beam group;

the corresponding target P-MPR value in each target group corresponds to group identification information of one beam group;

each of corresponding target P-MPR values in each target group corresponds to beam identification information corresponding to one antenna panel;

each of corresponding target P-MPR values in each target group corresponds to beam identification information corresponding to one beam group; or each of corresponding target P-MPR values in each target group corresponds to one piece of beam identification information.

In an implementation, the determination module 810 is further configured to: receive target configuration information sent by the network device, where the target configuration information is used to indicate that the target P-MPR value corresponds to at least one beam identification information, or at least one antenna panel identification information, or group identification information of at least one beam group.

In an implementation, the sending module 820 is configured to: in a case that the target condition is met, send a P-MPR report to the network device, where the target condition includes at least one of the following that:

a maximum permissible exposure MPE event occurs;

an equivalent isotropically radiated power reaches or exceeds an MPE threshold;

an equivalent isotropically radiated power reaches or exceeds a first threshold;

a maximum equivalent isotropically radiated power reaches or exceeds an MPE threshold;

a maximum equivalent isotropically radiated power reaches or exceeds a second threshold;

a transmit power reaches or exceeds a third threshold;

a transmit power reaches or exceeds an MPE threshold;

a maximum transmit power reaches or exceeds a fourth threshold;

a maximum transmit power reaches or exceeds an MPE threshold;

a radio frequency device is close to the human body;

activating or starting or adding a panel;

a path loss measurement value or a change value of path loss of a current panel or beam reaches or exceeds a fifth threshold;

a power backoff value or a change value of power of a current panel or beam reaches or exceeds a sixth threshold;

a P-MPR value or a change value of P-MPR value of a current panel or beam reaches or exceeds a seventh threshold;

a link quality value or a change value of link quality of a current panel or beam is equal to or lower than an eighth threshold;

a difference between a path loss measurement value of a current panel or beam and a path loss measurement value of a first panel or a first beam reaches or exceeds a ninth threshold;

a difference between a power backoff value of a current panel or beam and a power backoff value of a first panel or a first beam reaches or exceeds a tenth threshold;

a difference between a P-MPR value of a current panel or beam and a P-MPR value of a first panel or a first beam reaches or exceeds an eleventh threshold; or a difference between a link quality value of a current panel or beam and a link quality value of a first panel or a first beam is less than or equal to a twelfth threshold.

In an implementation, the sending module 820 is configured to:

send the P-MPR report to the network device through a first command, where the first command carries at least one of the following information:

the at least one target P-MPR value;

antenna panel identification information corresponding to at least one of the target P-MPR values;

group identification information of the beam group corresponding to at least one of the target P-MPR values;

beam identification information corresponding to at least one of the target P-MPR values;

a maximum output power value corresponding to the antenna panel identification information or the group identification information of the beam group or the beam identification information;

a power headroom PH value corresponding to the antenna panel identification information or the group identification information of the beam group or the beam identification information;

a maximum output power value of the terminal;

at least one target power value, where the target power value is a maximum output power minus the target P-MPR value;

at least one target power value and antenna panel identification information corresponding to the target power value;

at least one target power value and group identification information of the beam group corresponding to the target power value; or at least one target power value and beam identification information corresponding to the target power value.

The P-MPR reporting apparatus in the embodiment of the present application may be a device, a device with an operating system or an electronic device, or may be a component, an integrated circuit, or a chip in a terminal. The device or electronic device may be a mobile electronic device or a non-mobile electronic device.

For example, the mobile electronic device may be a mobile phone, a tablet computer, a laptop computer, a palmtop computer, an in-vehicle terminal, a wearable device, an ultra-mobile personal computer (UMPC), a netbook, or a personal digital assistant (PDA). The non-mobile electronic device may be a server, a network attached storage (NAS), a personal computer (PC), a television (TV), an automated teller machine or a self-service machine. This is not limited in the embodiments of the present application.

For the apparatus 800 according to the embodiments of the present application, refer to the flow of any one of the methods 200 to 700 corresponding to the embodiments of the present application, and each unit/module in the apparatus 800 and the above-mentioned other operations and/or functions are respectively used to realize the corresponding process in any one of the methods 200 to 700 and can achieve the same or equivalent technical effect. For brevity, no more details are given herein.

Figure 9:
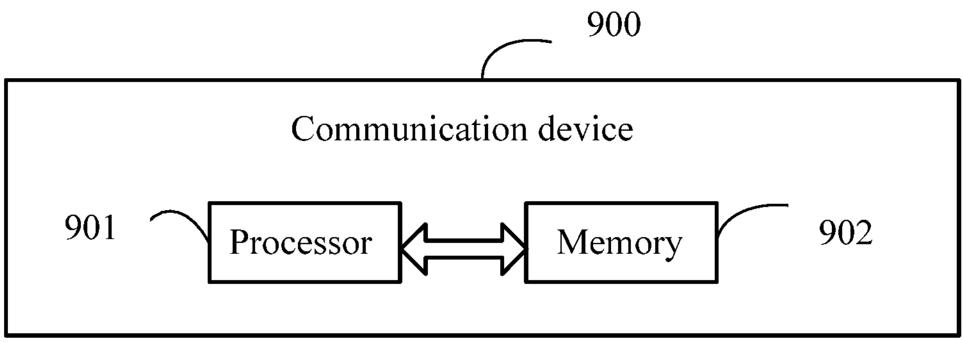
FIG. 9 is a schematic structural diagram of a communication device according to another embodiment of the present application.

Optionally, as shown in FIG. 9, an embodiment of the present application further provides a communication device 900, including a processor 901, a memory 902, and a program or an instruction stored in the memory 902 and executable on the processor 901. For example, when the communication device 900 is a terminal, when the program or instruction is executed by the processor 901, each process of the embodiment of the foregoing P-MPR reporting method is performed, and the same technical effect can be achieved. When the communication device 900 is a network side device, when the program or instruction is executed by the processor 901, each process of the above embodiment of the P-MPR reporting method is performed, and the same technical effect can be achieved. To avoid repetition, details are not repeated herein.

Embodiments of the present application also provide a terminal, including a processor and a communication interface, where the processor is configured to determine at least one target power management maximum power reduction P-MPR value; and the communication interface is configured to send a P-MPR report to a network device, where the P-MPR report carries at least one target P-MPR value, and the target P-MPR value corresponds to at least one target identification information, and the target identification information includes: at least one of beam identification information, antenna panel identification information, or group identification information of a beam group.

Figure 10:
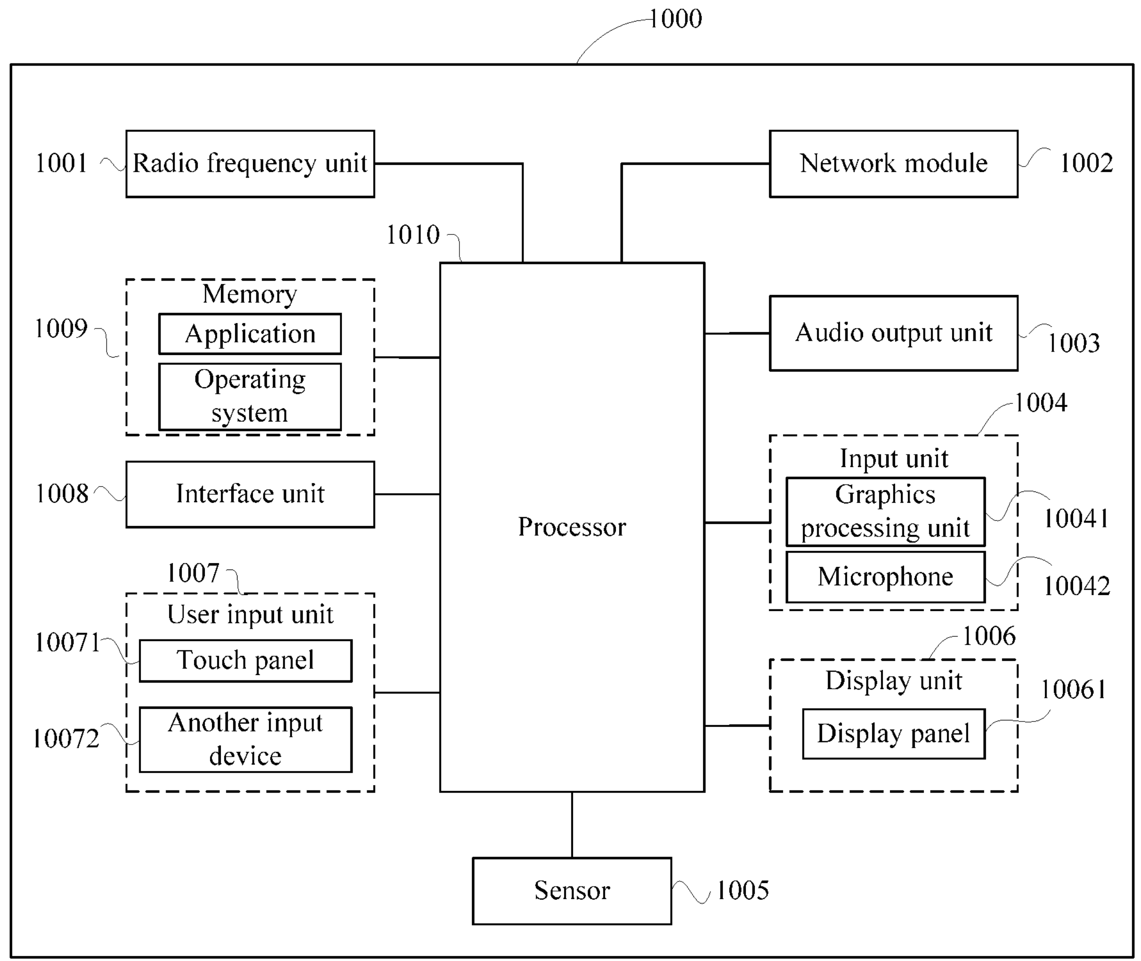
FIG. 10 is a schematic structural diagram of a terminal according to another embodiment of the present application.

This terminal embodiment corresponds to the foregoing method embodiment on the terminal side. Each implementation process and implementation of the foregoing method embodiment may be applicable to this terminal embodiment, and a same technical effect can be achieved. For example, FIG. 10 is a schematic diagram of the hardware structure of a terminal that implements an embodiment of the present application.

The terminal 1000 includes, but is not limited to: a radio frequency unit 1001, a network module 1002, an audio output unit 1003, an input unit 1004, a sensor 1005, a display unit 1006, a user input unit 1007, an interface unit 1008, a memory 1009, and a processor 1010.

It can be understood by a person skilled in the art that the terminal 1000 may further include a power supply (such as a battery) that supplies power to each component. The power supply may be logically connected to the processor 1010 by using a power management system, to implement functions such as charging, discharging, and power consumption management by using the power management system. The terminal structure shown in the figure does not constitute any limitation on the terminal, and the terminal may include more or fewer components than those shown in the figure, or combine some components, or have different component arrangements. Details are not described herein.

It should be understood that, in the embodiments of this application, the input unit 1004 may include a graphics processing unit (GPU) 10041 and a microphone 10042, and the graphics processing unit 10041 processes image data of a still picture or video obtained by an image capture apparatus (such as a camera) in a video capture mode or an image capture mode. The display unit 1006 may include a display panel 10061. Optionally, the display panel 10061 may be configured in a form such as a liquid crystal display or an organic light-emitting diode.

The user input unit 1007 includes a touch panel 10071 and another input device 10072. The touch panel 10071 is also referred to as a touchscreen. The touch panel 10071 may include two parts: a touch detection apparatus and a touch controller. The another input device 10072 may include but is not limited to a physical keyboard, a functional button (such as a volume control button or a power on/off button), a trackball, a mouse, and a joystick. Details are not described herein.

In this embodiment of this application, the radio frequency unit 1001 receives downlink data from a network side device and then sends the downlink data to the processor 1010 for processing; and sends uplink data to the network side device. Generally, the radio frequency unit 1001 includes but is not limited to an antenna, at least one amplifier, a transceiver, a coupler, a low noise amplifier, a duplexer, and the like.

The memory 1009 may be configured to store a software program or an instruction and various data. The memory 1009 may mainly include a program or instruction storage area and a data storage area. The program or instruction storage area may store an operating system, and an application or an instruction required by at least one function (for example, a sound playing function or an image playing function).

In addition, the memory 1009 may include high-speed random access memory, and may also include non-volatile memory, where the non-volatile memory may be a read-only memory (ROM), a programmable read-only memory (PROM), Erasable PROM (EPROM), Electrically Erasable Programmable Read-Only Memory (EEPROM) or flash memory, for example, at least one disk storage device, a flash memory device, or another non-volatile solid-state storage device.

The processor 1010 may include one or more processing units. Optionally, an application processor and a modem processor may be integrated into the processor 1010. The application processor mainly processes an operating system, a user interface, an application, an instruction, or the like. The modem processor mainly processes wireless communication, for example, a baseband processor. It can be understood that, alternatively, the modem processor may not be integrated into the processor 1010.

The processor 1010 is configured to determine at least one target power management maximum power reduction P-MPR value; and send a P-MPR report to a network device, where the P-MPR report carries at least one target P-MPR value, and the target P-MPR value corresponds to at least one target identification information, and the target identification information includes: at least one of beam identification information, antenna panel identification information, or group identification information of a beam group.

In an implementation, the maximum number N of target P-MPR values carried in the P-MPR report meets at least one of the following:

specified in the protocol;

configured by the network;

determined by the terminal;

less than or equal to the number of antenna panels of the terminal;

less than or equal to the number of beam groups supported by the terminal;

less than or equal to the number of beams supported by the terminal;

less than or equal to the number of beams on the antenna panel of the terminal; or less than or equal to the number of beams in the beam group supported by the terminal.

In an implementation, when the terminal reports a terminal capability, the maximum number M of target P-MPR values supported by the terminal is reported, where the N is less than or equal to the M.

In an implementation, in a case that the value of N is greater than 1, one target P-MPR value corresponds to one or multiple pieces of beam identification information.

In an implementation, the multiple pieces of beam identification information are any one of the following:

multiple pieces of beam identification information corresponding to a beam group; and multiple pieces of beam identification information corresponding to an antenna panel.

In an implementation, the beam identification information is determined by the terminal.

In an implementation, the target P-MPR value is determined from P-MPR values corresponding to the multiple pieces of beam identification information.

In an implementation, determining at least one target P-MPR value includes:

determining a first P-MPR value corresponding to each first beam identification information corresponding to the first antenna panel of the terminal or the first beam group of the terminal;

determining a first value corresponding to the first P-MPR value; and determining the first value as a first target P-MPR value, where the first target P-MPR value corresponds to at least one of the identification information of the first antenna panel, the group identification information of the first beam group, first beam identification information corresponding to the first antenna panel, or first beam identification information corresponding to the first beam group.

In an implementation, in a case that the first value meets the first reporting condition, the P-MPR report carries the first target P-MPR value.

In an implementation, after determining the first value as the first target P-MPR value, a second target P-MPR value is determined, where the second target P-MPR value corresponds to at least one of the identification information of the second antenna panel, the group identification information of the second beam group, second beam identification information corresponding to the second antenna panel, or second beam identification information corresponding to the second beam group; and in a case that the first target P-MPR value and/or the second target P-MPR value meets a second reporting condition, the P-MPR report carries the first target P-MPR value and/or the second target P-MPR value.

In an implementation, determining at least one target P-MPR value includes:

divide all third P-MPR values corresponding to all beam identification information corresponding to all antenna panels of the terminal or all beam groups of the terminal into multiple target groups; and determine corresponding target P-MPR values in the multiple target groups.

In an implementation, determining the corresponding target P-MPR values in the multiple target groups includes: determining a third value corresponding to each third P-MPR value in the first target group; and updating each third P-MPR value in the first target group based on the third value, and determine the target P-MPR value corresponding to the first target group based on each updated third P-MPR value; and determining, according to each third P-MPR value in the first target group, the target P-MPR value corresponding to the first target group.

In an implementation, in a case that the target P-MPR value corresponding to the first target group meets a third reporting condition, the P-MPR report carries the target P-MPR value corresponding to the first target group.

In an implementation, after determining the target P-MPR value corresponding to the first target group, the method further includes: determining the target P-MPR value corresponding to the second target group; in a case that the target P-MPR value corresponding to the first target group and/or the target P-MPR value corresponding to the second target group meets the fourth reporting condition, the P-MPR report carries the target P-MPR value corresponding to the first target group and/or the target P-MPR value corresponding to the second target group.

In an implementation, the number of target groups meets at least one of the following:

configured by the network;

specified in the protocol;

determined by the terminal;

less than or equal to the number of antenna panels;

less than or equal to the number of beam groups supported by the terminal;

less than or equal to the number of beams supported by the terminal;

less than or equal to the number of beams on the antenna panel of the terminal; or less than or equal to the number of beams in the beam group supported by the terminal.

In an implementation, the corresponding target P-MPR values in the multiple target groups meet at least one of the following that:

the corresponding target P-MPR value in each target group corresponds to one piece of antenna panel identification information;

the corresponding target P-MPR value in each target group corresponds to beam identification information corresponding to one antenna panel;

the corresponding target P-MPR value in each target group corresponds to beam identification information corresponding to one beam group;

the corresponding target P-MPR value in each target group corresponds to group identification information of one beam group;

each of corresponding target P-MPR values in each target group corresponds to beam identification information corresponding to one antenna panel;

each of corresponding target P-MPR values in each target group corresponds to beam identification information corresponding to one beam group; or each of corresponding target P-MPR values in each target group corresponds to one piece of beam identification information.

In an implementation, before the terminal sends the P-MPR report to the network device, target configuration information sent by the network device is received, where the target configuration information is used to indicate that the target P-MPR value corresponds to at least one beam identification information, or at least one antenna panel identification information, or group identification information of at least one beam group.

In an implementation, sending, by the terminal, a P-MPR report to the network device includes:

in a case that the target condition is met, sending, by the terminal, a P-MPR report to the network device, where the target condition includes at least one of the following that:

a maximum permissible exposure MPE event occurs;

an equivalent isotropically radiated power reaches or exceeds an MPE threshold;

an equivalent isotropically radiated power reaches or exceeds a first threshold;

a maximum equivalent isotropically radiated power reaches or exceeds an MPE threshold;

a maximum equivalent isotropically radiated power reaches or exceeds a second threshold;

a transmit power reaches or exceeds a third threshold;

a transmit power reaches or exceeds an MPE threshold;

a maximum transmit power reaches or exceeds a fourth threshold;

a maximum transmit power reaches or exceeds an MPE threshold;

a radio frequency device is close to the human body;

activating or starting or adding a panel;

a path loss measurement value or a change value of path loss of a current panel or beam reaches or exceeds a fifth threshold;

a power backoff value or a change value of power of a current panel or beam reaches or exceeds a sixth threshold;

a P-MPR value or a change value of P-MPR value of a current panel or beam reaches or exceeds a seventh threshold;

a link quality value or a change value of link quality of a current panel or beam is equal to or lower than an eighth threshold;

a difference between a path loss measurement value of a current panel or beam and a path loss measurement value of a first panel or a first beam reaches or exceeds a ninth threshold;

a difference between a power backoff value of a current panel or beam and a power backoff value of a first panel or a first beam reaches or exceeds a tenth threshold;

a difference between a P-MPR value of a current panel or beam and a P-MPR value of a first panel or a first beam reaches or exceeds an eleventh threshold; or a difference between a link quality value of a current panel or beam and a link quality value of a first panel or a first beam is less than or equal to a twelfth threshold.

In an implementation, sending, by the terminal, a P-MPR report to the network device includes:

sending, by the terminal, the P-MPR report to the network device through a first command, where the first command carries at least one of the following information:

the at least one target P-MPR value;

antenna panel identification information corresponding to at least one of the target P-MPR values;

group identification information of the beam group corresponding to at least one of the target P-MPR values;

beam identification information corresponding to at least one of the target P-MPR values;

a maximum output power value corresponding to the antenna panel identification information or the group identification information of the beam group or the beam identification information;

a power headroom PH value corresponding to the antenna panel identification information or the group identification information of the beam group or the beam identification information;

a maximum output power value of the terminal;

at least one target power value, where the target power value is a maximum output power minus the target P-MPR value;

at least one target power value and antenna panel identification information corresponding to the target power value;

at least one target power value and group identification information of the beam group corresponding to the target power value; or at least one target power value and beam identification information corresponding to the target power value.

For the terminal 1000 according to the embodiments of the present application, refer to the flow of any one of the methods 200 to 700 corresponding to the embodiments of the present application, and each unit/module in the terminal 1000 and the above-mentioned other operations and/or functions are respectively used to realize the corresponding process in any one of the methods 200 to 700 and can achieve the same or equivalent technical effect. For brevity, no more details are given herein.

An embodiment of the present application further provides a non-transitory readable storage medium. The non-transitory readable storage medium stores a program or an instruction, and when the program or the instruction is executed by a processor, the various processes of the foregoing P-MPR reporting method embodiment are performed and the same technical effects can be achieved. To avoid repetition, details are not described herein again.

The processor is a processor in the electronic device in the foregoing embodiment. The non-transitory readable storage medium includes a non-transitory computer-readable storage medium, such as a computer read-only memory (ROM), a random access memory (RAM), a magnetic disk, or an optical disc.

An embodiment of the present application further provides a chip, the chip includes a processor and a communication interface, the communication interface is coupled to the processor, and the processor is configured to run programs or instructions to implement each process of the embodiment of the foregoing P-MPR reporting method and the same technical effects can be achieved. To avoid repetition, details are not described herein again.

It should be understood that the chip mentioned in this embodiment of this application may also be referred to as a system-level chip, a system chip, a chip system, or an on-chip system chip.

An embodiment of the present application further provides a computer program product. The computer program product includes a processor, a memory, and a program or an instruction stored in the memory and executable on the processor, where when the program or the instruction is executed by the processor, the steps of the P-MPR reporting method are implemented.

An embodiment of the present application further provides an electronic device. The electronic device is configured to perform each process of the above P-MPR reporting method embodiment, and can achieve the same technical effect. To avoid duplication, the details will not be described here.

It should be noted that, in this specification, the term "include", "comprise", or any other variant thereof is intended to cover a non-exclusive inclusion, so that a process, a method, an article, or an apparatus that includes a list of elements not only includes those elements but also includes other elements which are not expressly listed, or further includes elements inherent to such process, method, article, or apparatus.

In the absence of more restrictions, an element defined by the statement "including a . . . " does not exclude another same element in a process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only.

Based on such an understanding, the technical solutions of this application essentially, or the part contributing to the prior art may be implemented in a form of a computer software product. The computer software product is stored in a storage medium (for example, a ROM/RAM, a magnetic disk, or a compact disc), and includes a plurality of instructions for instructing an electronic device (which may be a mobile phone, a computer, a server, a network device, or the like) to perform the method described in the embodiments of this application.

The embodiments of this application are described above with reference to the accompanying drawings, but this application is not limited to the above implementations, and the above implementations are only illustrative and not restrictive. Under the enlightenment of this application, those of ordinary skill in the art can make many forms without departing from the purpose of this application and the protection scope of the claims, all of which fall within the protection of this application.

What is claimed is:

1. A P-MPR reporting method, comprising:

determining, by a terminal, at least one target power management maximum power reduction (P-MPR) value; and sending, by the terminal, a P-MPR report to a network device, wherein the P-MPR report carries the at least one target P-MPR value, and a target P-MPR value corresponds to at least one target identification information, and target identification information comprises: at least one of beam identification information, antenna panel identification information, or group identification information of a beam group;

wherein, in a case that a value of N is greater than 1, one target P-MPR value corresponds to one or multiple pieces of beam identification information, wherein N is a maximum number of target P-MPR values carried in the P-MPR report;

wherein, the determining by a terminal, at least one target P-MPR value comprises:

dividing, by the terminal, all third P-MPR values corresponding to all beam identification information corresponding to all antenna panels of the terminal or all beam groups of the terminal into multiple target groups; and determining, by the terminal, corresponding target P-MPR values in the multiple target groups.

2. The method according to claim 1, wherein the maximum number N of the target P-MPR values carried in the P-MPR report meets at least one of the following:

specified in a protocol;

configured by a network;

determined by the terminal;

less than or equal to a number of antenna panels of the terminal;

less than or equal to a number of beam groups supported by the terminal;

less than or equal to a number of beams supported by the terminal;

less than or equal to a number of beams on an antenna panel of the terminal; or less than or equal to a number of beams in a beam group supported by the terminal.

3. The method according to claim 2, wherein when the terminal reports a terminal capability, a maximum number M of target P-MPR values supported by the terminal is reported, wherein N is less than or equal to M.

4. The method according to claim 1, wherein the multiple pieces of beam identification information are any one of the following:

multiple pieces of beam identification information corresponding to one beam group; and multiple pieces of beam identification information corresponding to one antenna panel.

5. The method according to claim 1, wherein the beam identification information is determined by the terminal.

6. The method according to claim 1, wherein the determining, by the terminal, corresponding target P-MPR values in the multiple target groups comprises:

determining, by the terminal, a third value corresponding to each third P-MPR value in a first target group; and updating each third P-MPR value in the first target group based on the third value, and determining a target P-MPR value corresponding to the first target group based on each updated third P-MPR value;

or determining, by the terminal according to each third P-MPR value in the first target group, the target P-MPR value corresponding to the first target group.

7. The method according to claim 6, wherein in a case that the target P-MPR value corresponding to the first target group meets a third reporting condition, the P-MPR report carries the target P-MPR value corresponding to the first target group.

8. The method according to claim 6, wherein after determining, by the terminal, the target P-MPR value corresponding to the first target group, the method further comprises:

determining, by the terminal, a target P-MPR value corresponding to a second target group; wherein in a case that the target P-MPR value corresponding to the first target group and/or the target P-MPR value corresponding to the second target group meets a fourth reporting condition, the P-MPR report carries the target P-MPR value corresponding to the first target group and/or the target P-MPR value corresponding to the second target group.

9. The method according to claim 1, wherein a number of target groups meets at least one of the following:

configured by a network;

specified in a protocol;

determined by the terminal;

less than or equal to a number of antenna panels;

less than or equal to a number of beam groups supported by the terminal;

less than or equal to a number of beams supported by the terminal;

less than or equal to a number of beams on an antenna panel of the terminal; or less than or equal to a number of beams in a beam group supported by the terminal.

10. The method according to claim 1, wherein the corresponding target P-MPR values in the multiple target groups meet at least one of the following that:

a corresponding target P-MPR value in each target group corresponds to one piece of antenna panel identification information;

the corresponding target P-MPR value in each target group corresponds to beam identification information corresponding to one antenna panel;

the corresponding target P-MPR value in each target group corresponds to beam identification information corresponding to one beam group;

the corresponding target P-MPR value in each target group corresponds to group identification information of one beam group;

each of corresponding target P-MPR values in each target group corresponds to beam identification information corresponding to one antenna panel;

each of corresponding target P-MPR values in each target group corresponds to beam identification information corresponding to one beam group; or each of corresponding target P-MPR values in each target group corresponds to one piece of beam identification information.

11. The method according to claim 1, wherein before the terminal sends the P-MPR report to the network device, the method further comprises:

receiving, by the terminal, target configuration information sent by the network device, wherein the target configuration information is used to indicate that the target P-MPR value corresponds to at least one beam identification information, or at least one antenna panel identification information, or group identification information of at least one beam group.

12. The method according to claim 1, wherein the sending, by the terminal, a P-MPR report to a network device comprises:

in a case that a target condition is met, sending, by the terminal, the P-MPR report to the network device, wherein the target condition comprises at least one of the following that:

a maximum permissible exposure (MPE) event occurs;

an equivalent isotropically radiated power reaches or exceeds an MPE threshold;

an equivalent isotropically radiated power reaches or exceeds a first threshold;

a maximum equivalent isotropically radiated power reaches or exceeds an MPE threshold;

a maximum equivalent isotropically radiated power reaches or exceeds a second threshold;

a transmit power reaches or exceeds a third threshold;

a transmit power reaches or exceeds an MPE threshold;

a maximum transmit power reaches or exceeds a fourth threshold;

a maximum transmit power reaches or exceeds an MPE threshold;

a radio frequency device is close to a human body;

activating or starting or adding a panel;

a path loss measurement value or a change value of path loss of a current panel or beam reaches or exceeds a fifth threshold;

a power backoff value or a change value of power of a current panel or beam reaches or exceeds a sixth threshold;

a P-MPR value or a change value of P-MPR value of a current panel or beam reaches or exceeds a seventh threshold;

a link quality value or a change value of link quality of a current panel or beam is equal to or lower than an eighth threshold;

a difference between a path loss measurement value of a current panel or beam and a path loss measurement value of a first panel or a first beam reaches or exceeds a ninth threshold;

a difference between a power backoff value of a current panel or beam and a power backoff value of a first panel or a first beam reaches or exceeds a tenth threshold;

a difference between a P-MPR value of a current panel or beam and a P-MPR value of a first panel or a first beam reaches or exceeds an eleventh threshold; or a difference between a link quality value of a current panel or beam and a link quality value of a first panel or a first beam is less than or equal to a twelfth threshold.

13. The method according to claim 1, wherein the sending, by the terminal, a P-MPR report to a network device comprises:

sending, by the terminal, the P-MPR report to the network device through a first command, wherein the first command carries at least one of the following information:

the at least one target P-MPR value;

antenna panel identification information corresponding to at least one of target P-MPR values;

group identification information of the beam group corresponding to at least one of target P-MPR values;

beam identification information corresponding to at least one of target P-MPR values;

a maximum output power value corresponding to the antenna panel identification information or the group identification information of the beam group or the beam identification information;

a power headroom (PH) value corresponding to the antenna panel identification information or the group identification information of the beam group or the beam identification information;

a maximum output power value of the terminal;

at least one target power value, wherein the target power value is a maximum output power minus a target P-MPR value;

at least one target power value and antenna panel identification information corresponding to a target power value;

at least one target power value and group identification information of a beam group corresponding to a target power value; or at least one target power value and beam identification information corresponding to a target power value.

14. A terminal, comprising a processor, a memory, and a program or an instruction stored in the memory and executable on the processor, wherein the program or the instruction, when executed by the processor, causes the terminal to perform:

determining at least one target power management maximum power reduction (P-MPR) value; and sending a P-MPR report to a network device, wherein the P-MPR report carries the at least one target P-MPR value, and a target P-MPR value corresponds to at least one target identification information, and target identification information comprises: at least one of beam identification information, antenna panel identification information, or group identification information of a beam group;

wherein, in a case that a value of N is greater than 1, one target P-MPR value corresponds to one or multiple pieces of beam identification information, wherein N is a maximum number of target P-MPR values carried in the P-MPR report;

wherein the determining at least one target P-MPR value comprises:

dividing all third P-MPR values corresponding to all beam identification information corresponding to all antenna panels of the terminal or all beam groups of the terminal into multiple target groups; and determining corresponding target P-MPR values in the multiple target groups.

15. A non-transitory readable storage medium, storing a program or an instruction, wherein the program or the instruction, when executed by a processor of a terminal, causes the terminal to perform:

determining at least one target power management maximum power reduction (P-MPR) value; and sending a P-MPR report to a network device, wherein the P-MPR report carries the at least one target P-MPR value, and a target P-MPR value corresponds to at least one target identification information, and target identification information comprises: at least one of beam identification information, antenna panel identification information, or group identification information of a beam group;

wherein, in a case that a value of N is greater than 1, one target P-MPR value corresponds to one or multiple pieces of beam identification information, wherein N is a maximum number of target P-MPR values carried in the P-MPR report;

wherein the determining at least one target P-MPR value comprises:

dividing all third P-MPR values corresponding to all beam identification information corresponding to all antenna panels of the terminal or all beam groups of the terminal into multiple target groups; and determining corresponding target P-MPR values in the multiple target groups.

16. The non-transitory readable storage medium according to claim 15, wherein the maximum number N of the target P-MPR values carried in the P-MPR report meets at least one of the following:

specified in a protocol;

configured by a network;

determined by the terminal;

less than or equal to a number of antenna panels of the terminal;

less than or equal to a number of beam groups supported by the terminal;

less than or equal to a number of beams supported by the terminal;

less than or equal to a number of beams on an antenna panel of the terminal; or less than or equal to a number of beams in a beam group supported by the terminal.

17. The non-transitory readable storage medium according to claim 15, wherein the multiple pieces of beam identification information are any one of the following:

multiple pieces of beam identification information corresponding to one beam group; and multiple pieces of beam identification information corresponding to one antenna panel.

18. The non-transitory readable storage medium according to claim 15, wherein the beam identification information is determined by the terminal.

19. The non-transitory readable storage medium according to claim 15, wherein a number of target groups meets at least one of the following:

configured by a network;

specified in a protocol;

determined by the terminal;

less than or equal to a number of antenna panels;

less than or equal to a number of beam groups supported by the terminal;

less than or equal to a number of beams supported by the terminal;

less than or equal to a number of beams on an antenna panel of the terminal; or less than or equal to a number of beams in a beam group supported by the terminal.

20. The non-transitory readable storage medium according to claim 15, the corresponding target P-MPR values in the multiple target groups meet at least one of the following that:

a corresponding target P-MPR value in each target group corresponds to one piece of antenna panel identification information;

the corresponding target P-MPR value in each target group corresponds to beam identification information corresponding to one antenna panel;

the corresponding target P-MPR value in each target group corresponds to beam identification information corresponding to one beam group;

the corresponding target P-MPR value in each target group corresponds to group identification information of one beam group;

each of corresponding target P-MPR values in each target group corresponds to beam identification information corresponding to one antenna panel;

each of corresponding target P-MPR values in each target group corresponds to beam identification information corresponding to one beam group; or each of corresponding target P-MPR values in each target group corresponds to one piece of beam identification information.

* * * * *